March 29, 1932.  J. H. BANINGER  1,851,561
BEARING MOUNTING
Filed June 4, 1927

INVENTOR;
JOHN H. BANINGER,

BY *Galen S. Moore*
HIS ATTORNEY.

Patented Mar. 29, 1932

1,851,561

UNITED STATES PATENT OFFICE

JOHN H. BANINGER, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

BEARING MOUNTING

Application filed June 4, 1927. Serial No. 196,582.

This invention relates to bearing mountings and comprises all the features of novelty herein disclosed, by way of example, in connection with load cushioned bearing mountings for wheels or shafts to cushion rolling bearings against the shock of end thrusts and heavy radial loads.

An object of the invention is to provide an improved wheel or shaft mounting in which antifriction or other bearings can be used to advantage without excessive or destructive shock loads coming upon them, thereby enabling smaller bearings to be used without sacrifice of service or accuracy. Another object is to provide an improved wheel or shaft mounting wherein radial load shocks and end thrust shocks, or either radial or end thrust shocks will be damped and noise decreased. To these ends and to improve generally upon devices of this character, the invention also consists in the various matters hereinafter described and claimed.

Figure 2:
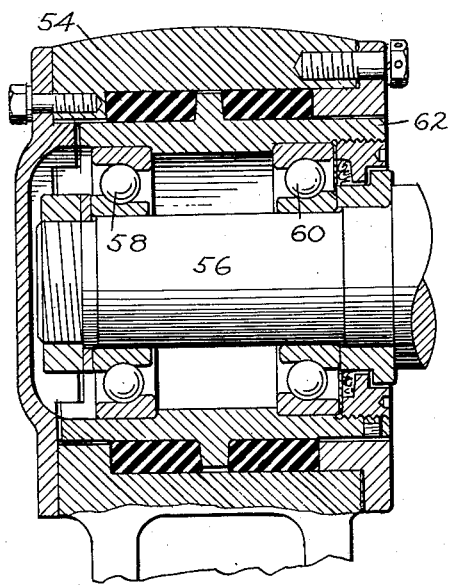
Figure 1:
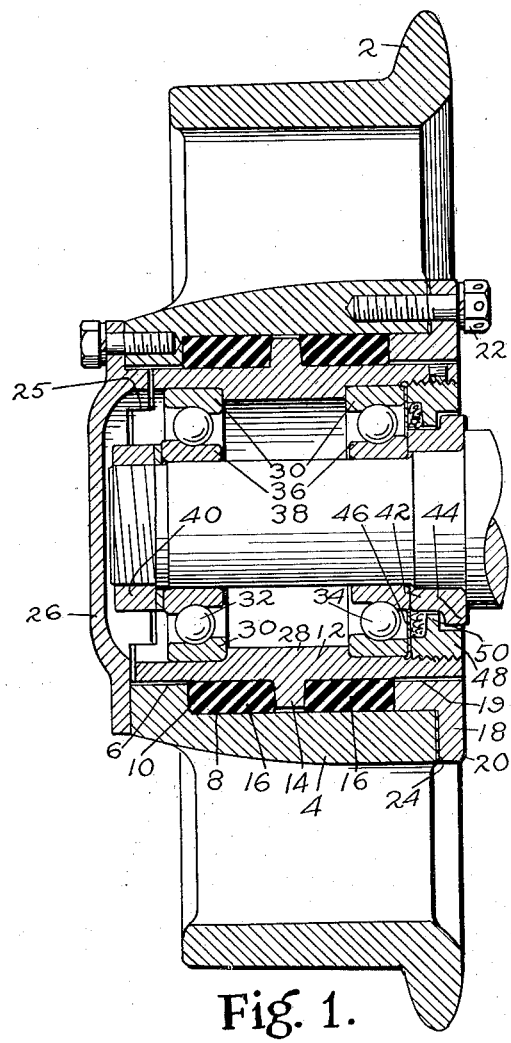
Figure 3:
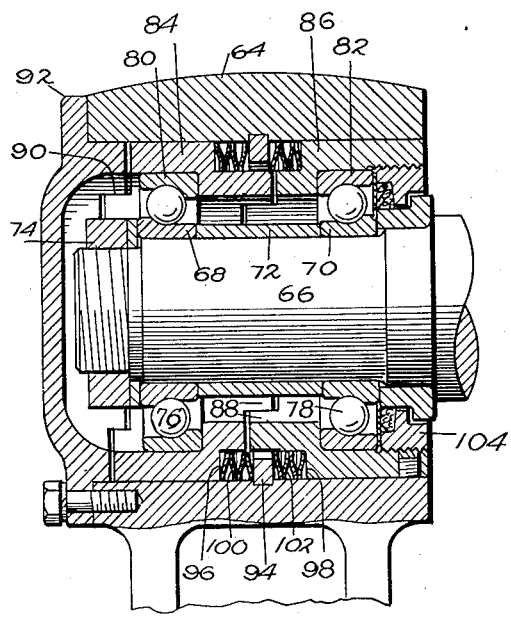

In its broader aspects, the invention is not necessarily limited to the specific constructions selected for illustrative purposes in the accompanying drawings in which Figure 1 is an axial section through one form of cushioned bearing mounting and Figures 2 and 3 are similar views of modified forms of mountings.

The numeral 2 indicates the rim of a wheel such as the flanged rim of a carwheel having a hub or casing 4 provided with a cylindrical bore 6 and with a cylindrical counterbore 8 terminating in an annular shoulder 10 which forms an abutment and one end wall of a recess. The bore 6 has a free slip fit on the cylindrical periphery of a rotatable sleeve 12 having a central projection in the form of an outwardly extending annular rib 14. Compressible cushioning material, such as rubber in the form of rings 16, is inserted between the rib 14 and the shoulder 10, and between the rib and a second abutment formed by the end of a flanged ring 18 which also has a cylindrical bore 19 with a free slip fit on the sleeve 12. The clearance between the sleeve 12 and the enclosing bores 6 and 19 is small (being exaggerated in the figure) and under certain conditions the surfaces can come into contact as will appear. The ring 18 is a detachable part of the hub or casing 4 and has an end flange 20 secured to the hub or casing by screw bolts 22. The ring 18 and shoulder 10 radially overlap the rib 14 and define the ends of an annular recess in the casing and provide annular faces opposed to and axially spaced from annular faces at the sides of rib 14. Suitable shims or washers 24 may be inserted between the flange 20 and the casing to adjust the position of the ring 18, for the purpose of applying the desired initial pressure to the compressible cushioning material to cause the latter to sustain any desired amount of radial load before the sleeve and casing come into actual contact. The compression of the material tends to cause the casing and sleeve to rotate as one but, to prevent possibility of relative rotation, the end of the sleeve is preferably provided with teeth 25 to interlock with similar teeth on a dished cap 26 bolted to the casing.

Any suitable plain or rolling bearings may be provided for rotatably supporting the sleeve 12. In the illustrated construction, the sleeve has an inwardly extending annular extension 28 forming shoulders to abut against outer race rings 30 of ball bearings 32 and 34 of the angular contact type which have their thrust shoulders facing away from each other. Inner race rings 36, having their thrust shoulders facing one another, are sleeved on an axle or shaft 38, the inner race ring of bearing 32 being held by a nut 40 screwed on the end of the shaft or axle. The other inner race ring abuts against a ring 42 which has a flange 44 bearing against a shoulder on the shaft. The bearings hold the sleeve 12 against endwise movement with respect to the shaft but, whenever one of the cushions is compressed by an axial shock load, relative axial movement between the shaft and the casing is permitted by the lost motion space between the ends of the interlocking teeth 25 and the bottom of their cooperating notches. A lubricant holding washer 46 fitting in the sleeve 12 is enclosed by a flanged nut 48 threaded in the sleeve 12 and having a flange 50 closely embracing the ring 42 at the side of the flange 44.

Lateral thrust forces causing relative axial movement between the hub or casing and the shaft or axle are absorbed or damped by the cushioning material thereby lessening noise and decreasing shock load on the antifriction bearings. Normal radial load is also transmitted through the cushioning material which damps radial shock such as that caused by the wheel travelling over rail joints. In case of abnormal load, the sleeve 12 can come into actual load contact with the bores 6 and 19 of the hub or casing. Slight initial compression of the cushioning material may be sufficient to hold the hub or casing to the sleeve 12 to turn with the latter but the cushioning material can be compressed to any desired extent by varying the shims or washers 24 in order that the desired amount of radial load will be sustained before the casing and sleeve come into actual supporting contact. To remove the wheel, the flanged ring 18 is the only member which needs to be removed and the bearings are left undisturbed and enclosed by the sleeve 12. The benefits of the invention may also be obtained in a structure wherein the axle or shaft is rotatable and the hub or similar member 4 is a relatively fixed casing.

In Figure 2, a casing or journal box 54 receives a rotary shaft or axle 56, the shaft being rotatably mounted on bearings 58 and 60 in a sleeve 62 which is provided with cushioning material between it and the journal box. The details of construction may be analogous to the construction illustrated and described in connection with Figure 1.

In Figure 3, the construction is such as to cushion end thrust shock on the bearings. A casing or journal box 64 receives a rotary shaft or axle 66, the shaft carrying inner race rings 68 and 70 spaced by a sleeve 72 and held by a nut 74 threaded on the end of the shaft. Ball bearings 76 and 78 have their outer race rings 80 and 82 abutting against shoulders in a sleeve composed of two sections 84 and 86 which have interlocking teeth 88 to prevent relative rotation. There is a small axial clearance between the sleeve sections to allow a relative axial movement. One of the sleeve sections has teeth 90 interlocking with similar teeth on a cap 92 secured to the casing 64 and the sleeve section and cap have provision for a little relative axial movement as by the axial space between the ends of the teeth 90 and the bottom of the cooperating notches. The box is conveniently split, as on the horizontal center line, to provide for assembly. An annular projection or rib in the form of a ring 94 is inserted in a groove in the interior of the box and projects inwardly into an annular recess formed between shoulders 96 and 98 near the adjacent ends of the sleeve sections outside their interlocking portions. The sleeve sections have external sliding engagement with the cylindrical inner surface of the box. Between the shoulders 96 and 98 and the ring or projection 94 are mounted cushioning means in the form of series of dished spring washers 100 and 102 arranged alternately and normally placed by the nut 74 under a little initial tension which tends to urge the sleeve sections away from one another and thereby cause the bearings to maintain an angular contact position to avoid looseness. In case of an end thrust load or shock on the shaft to the left in Figure 3, the sleeve section 86 slides a little axially in the casing compressing the spring washers 102 which absorb the shock and relieve the bearings 78. The opposing spring washers 100, being under their initial tension, cause the other sleeve section 84 to slide in the box and maintain the initial thrust load on the bearing 76. Thus the sleeve sections slide in the same direction simultaneously. End thrust load or shock in the other direction is absorbed by the spring washers 100 in a similar manner. The end of the sleeve section 86 may be provided with a ring nut 104 and a suitable lubricant seal as in the other embodiments of the invention.

I claim:

1. The combination with a shaft and a casing between which there is relative rotation, one of said members having an abutment, of bearings mounted upon the other of said members, a sleeve between said bearings and said member having said abutment, said sleeve also being mounted upon said bearings, an abutment upon said sleeve axially spaced from said first-recited abutment but radially over-lapping the same, one abutment being movable axially towards the other, and a resilient cushion between said abutments to cushion said axial movement; substantially as described.

2. The combination with a shaft and a casing between which there is relative rotation, one of said members being provided with a recess, of thrust and radial load bearings mounted upon the other of said members, a sleeve between said bearings and said recessed member and also mounted upon said bearings, a projection upon said sleeve and extending into said recess, the projection radially overlapping but axially spaced from the end walls of the recess to approach one of them, and a resilient cushion in said recess at each side of said projection to relieve the bearings of axial shock loads; substantially as described.

3. The combination with a shaft and a casing between which there is relative rotation, one of said members being provided with a recess, of bearings mounted upon the other of said members, a sleeve between said bearings and said recessed member and also mounted upon said bearings, an annular rib upon said sleeve and projecting into said recess between its ends, and a resilient cushioning ring in said recess at each side of said rib; substantially as described.

4. The combination with a shaft and a casing between which there is relative rotation, one of said members having a projection extending toward the other thereof, of bearings mounted upon such other of said members, a plate removably secured to said member having said projection and co-operating with said projection to produce a recess, a sleeve between said bearings and said recessed member and also mounted upon said bearings, a projection upon said sleeve extending into said recess, and a resilient cushion in said recess upon each side of said sleeve projection; substantially as described.

5. The combination with a shaft and a casing between which there is relative rotation, said casing having an annular recess opening toward said shaft, of axial-thrust-resisting rolling bearings having their cones secured to said shaft, a sleeve between said shaft and casing and having the cups of said bearings secured thereto, a projection upon said sleeve extending into said recess of said casing, and a resilient cushion in said recess at each side of said sleeve-projection; substantially as described.

6. In a device of the character described, a shaft, a sleeve surrounding the shaft, a casing surrounding the sleeve, thrust and radial load bearing means interposed between the sleeve and one of the other members to prevent relative axial movement between the sleeve and said one other member while providing for relative rotation between them, that surface of the sleeve which is opposite to the bearing means, and the remaining member, having axially spaced and radially overlapping parts which can approach and recede from one another in an axial direction, and compressible cushioning material interposed axially between said overlapping parts for yieldingly resisting said axial movement and relieving the bearing means of axial shock load; substantially as described.

7. In a device of the character described, a shaft, a sleeve surrounding the shaft, a casing surrounding the sleeve, spaced bearings of angular contact type interposed between the sleeve and one of the other members to prevent relative axial movement between the sleeve and said one other member while providing for relative rotation between them, that surface of the sleeve which is opposite to the bearings, and the remaining member, having axially spaced and radially overlapping parts which can approach and recede from one another in an axial direction, said overlapping parts comprising an annular rib extending between spaced annular surfaces, compressible cushioning material interposed axially between opposite sides of the rib and the annular surfaces for yieldingly resisting said axial movement and thereby relieving the bearings of axial shock loads in two directions; substantially as described.

8. In a device of the character described, a shaft, a sleeve surrounding the shaft, a casing surrounding the sleeve, spaced bearings of angular contact type interposed between the sleeve and the shaft to prevent relative axial movement between the sleeve and the shaft while providing for relative rotation between them, the sleeve having an outwardly projecting rib and the casing having an internal projection overlapping the rib, the rib and projection being axially spaced to approach or recede from one another in an axial direction, compressible cushioning material interposed axially between the rib and the projection for yieldingly resisting said axial movement and relieving the bearings of axial shock loads, and lost motion interengaging means allowing the sleeve and the casing to have said relative axial movement while preventing relative rotation thereof; substantially as described.

9. In a device of the character described, a shaft, a sleeve surrounding the shaft, a casing surrounding the sleeve, thrust and radial load bearing means interposed between the sleeve and one of the other members to prevent relative axial movement between the sleeve and said one other member while providing for relative rotation between them, the sleeve and the remaining member having axially spaced and radially overlapping parts which can approach and recede from one another in an axial direction, compressible cushioning material interposed axially between said overlapping parts, and one of said overlapping parts comprising a plate removably attached to its supporting member to provide for separation of shaft and casing without disturbing the bearing means; substantially as described.

10. In a device of the character described, a shaft, a sleeve surrounding the shaft, a casing surrounding the sleeve, thrust and radial load bearing means interposed between the sleeve and one of the other members to prevent relative axial movement between the sleeve and said one other member while providing for relative rotation between them, the sleeve having a projection and the remaining member having a recess receiving the projection between the end walls thereof, cushioning material in the recess at each side of the projection, and a removable plate attached to said remaining member and forming one of said end walls; substantially as described.

11. In a device of the character described, a shaft, a sleeve surrounding the shaft, a casing surrounding the sleeve, thrust and radial load bearing means interposed between the sleeve and one of the other members to prevent relative axial movement between the sleeve and said one other member while providing for relative rotation between them, the sleeve having an annular rib and the remaining member having a recess receiving the rib axially between the end walls thereof, rings of cushioning material in the recess and engaging opposite sides of the rib, and a removable ring attached to said remaining member and forming one of the end walls of the recess; substantially as described.

In testimony whereof I hereunto affix my signature.

JOHN H. BANINGER.